(12) United States Patent
Sirous et al.

(10) Patent No.: US 9,714,097 B1
(45) Date of Patent: Jul. 25, 2017

(54) PASSENGER'S LIFE SEAT

(71) Applicants: Saeid Sirous, Najaf abad (IR); Vahid Sirous, Najaf abad (IR); Mohammad Bagher Sirous, bandar abbas (IR)

(72) Inventors: Saeid Sirous, Najaf abad (IR); Vahid Sirous, Najaf abad (IR); Mohammad Bagher Sirous, bandar abbas (IR)

( * ) Notice: Subject to any disclaimer, the term of this patent is extended or adjusted under 35 U.S.C. 154(b) by 0 days.

(21) Appl. No.: 15/469,732

(22) Filed: Mar. 27, 2017

Related U.S. Application Data

(63) Continuation-in-part of application No. 14/948,264, filed on Nov. 21, 2015, now abandoned.

(51) Int. Cl.
*B62D 25/04* (2006.01)
*B64D 25/04* (2006.01)
*B64D 25/00* (2006.01)
*B64D 13/00* (2006.01)
*B64D 11/06* (2006.01)
*B60R 21/207* (2006.01)
*B60R 21/00* (2006.01)

(52) U.S. Cl.
CPC ............ *B64D 25/04* (2013.01); *B60R 21/207* (2013.01); *B64D 11/0621* (2014.12); *B64D 13/00* (2013.01); *B64D 25/00* (2013.01); *B60R 2021/0093* (2013.01); *B64D 2231/025* (2013.01)

(58) Field of Classification Search
CPC ........ B64D 25/04; B64D 25/00; B64D 13/00; B64D 11/0621; B64D 2231/025; B60R 21/207; B60R 2021/0093
See application file for complete search history.

(56) References Cited

U.S. PATENT DOCUMENTS

| 4,508,294 | A | * | 4/1985 | Lorch | B64D 25/02 244/122 AG |
| 4,739,953 | A | * | 4/1988 | Soffiantini | B64D 25/12 244/121 |
| 4,749,153 | A | * | 6/1988 | Herndon | B64D 25/10 244/122 A |
| 5,039,162 | A | * | 8/1991 | Yoshida | B64D 25/04 244/141 |
| 5,331,956 | A | * | 7/1994 | Bailey | A62B 17/003 128/200.24 |
| 6,315,245 | B1 | * | 11/2001 | Ruff | B64D 25/02 244/122 AG |
| 2009/0233505 | A1 | * | 9/2009 | Kwok | A62B 99/00 441/80 |

* cited by examiner

*Primary Examiner* — Drew J Brown (57) ABSTRACT

A protective cover that is
 resistant to absorption and transfer of heat
 resistant to shocks and penetration of sharp objects
 and damping shocks at the events,
Which combined with the seat fully covers the passenger, and protects him/her against shocks, burns and sharp objects in accidents and is searchable by location-finders.

8 Claims, 11 Drawing Sheets

PASSENGER'S LIFE SEAT

CROSS-REFERENCE TO RELATED APPLICATIONS

Continuation-in-part of application Ser. No. 14/948,264 (Filing Date Nov. 21, 2015)

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

U.S. Patent Classification
244/121-441/125~7-244/118

Flight safety can be divided into two major parts, given recent advances in the field of flight safety:
  Airplane safety, including the safety of aircraft parts, engines, etc.
  Passenger safety, including seat belts, air masks and life vests.

In the passenger aircrafts, seat belts, air masks and life vests are used for safety of the passengers. These tools do not protect passengers from fire and heavy shocks of aviation accidents. Given recent aviation incidents and high casualties, it is necessary to review the safety devices for passengers on the plane.

BRIEF SUMMARY OF THE INVENTION

The target is to design a cover that along with a seat cover the passenger's body and reduce the casualties on aviation accidents. According to the FIG. 2, each cover is composed of four main layers and reinforcing bars that protect passengers from fire and impacts.

The first layer consists of flexible intumescent fire that is covered with aluminum foil to reflect the maximum heat flux and absorb the least heat flux. The second layer is resistant to the penetration of sharp objects into the passenger's body and spreading spot shocks. The third layer is composed of material that is resistant to high temperatures as well as ultra-low thermal conductivity. The fourth layer consists of Airbags for damping of the shocks and holding the passenger in place. This life shield is designed in a way that it has the capability to be disengaged from seat and serve as a boat to float the passenger on water in a lie-down position.

DETAILED DESCRIPTION OF THE INVENTION

I. Invention Objective

The target is to design a cover that along with a seat, cover the passenger's body and reduce the casualties on aviation accidents.

II. Description of Drawings and Parts

Figure 1:
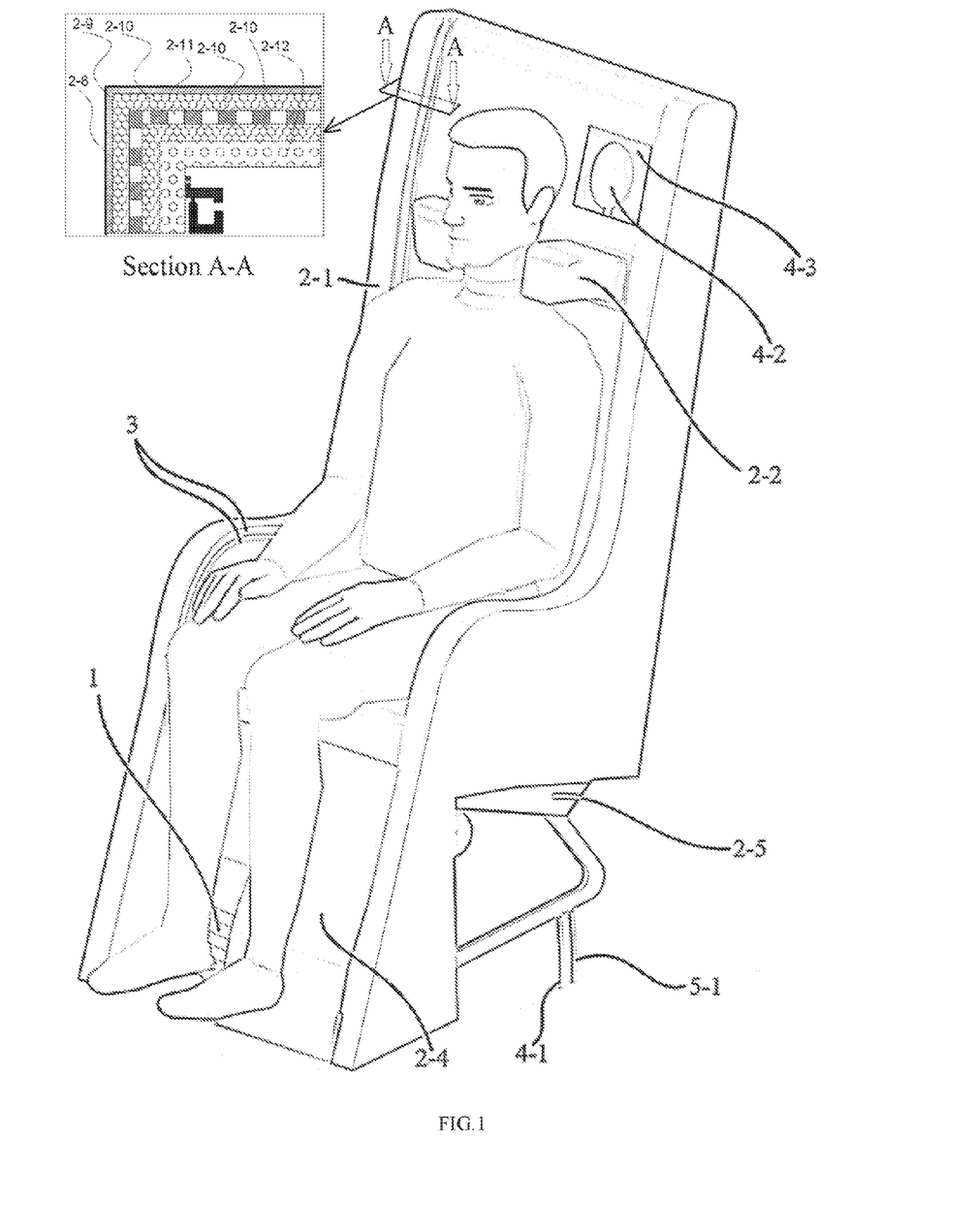
FIG. 1: Seat and life shield at normal status.

FIG. 1: Seat and life shield at normal status. This figure is composed of:
  1) Life shield (Retracted)
  2-1) Seat sides
  2-2) Shoulder restraint
  2-4) Removable cover
  2-5) Protection Box for Oxygen and CO2 cylinders
  2-8) Intumescent fire resistive coating
  2-9) Seat body
  2-10) Ceramic fiber board
  2-11) Cooling Duct
  2-12) Ceramic fiber blanket
  3) Guide rails
  4-1) Breathing air hose (air is supplied by airplane engine)
  4-2) Air mask
  4-3) Air mask box
  5-1) Air hose to inflate the airbags (air is supplied by airplane engine)

Figure 2:
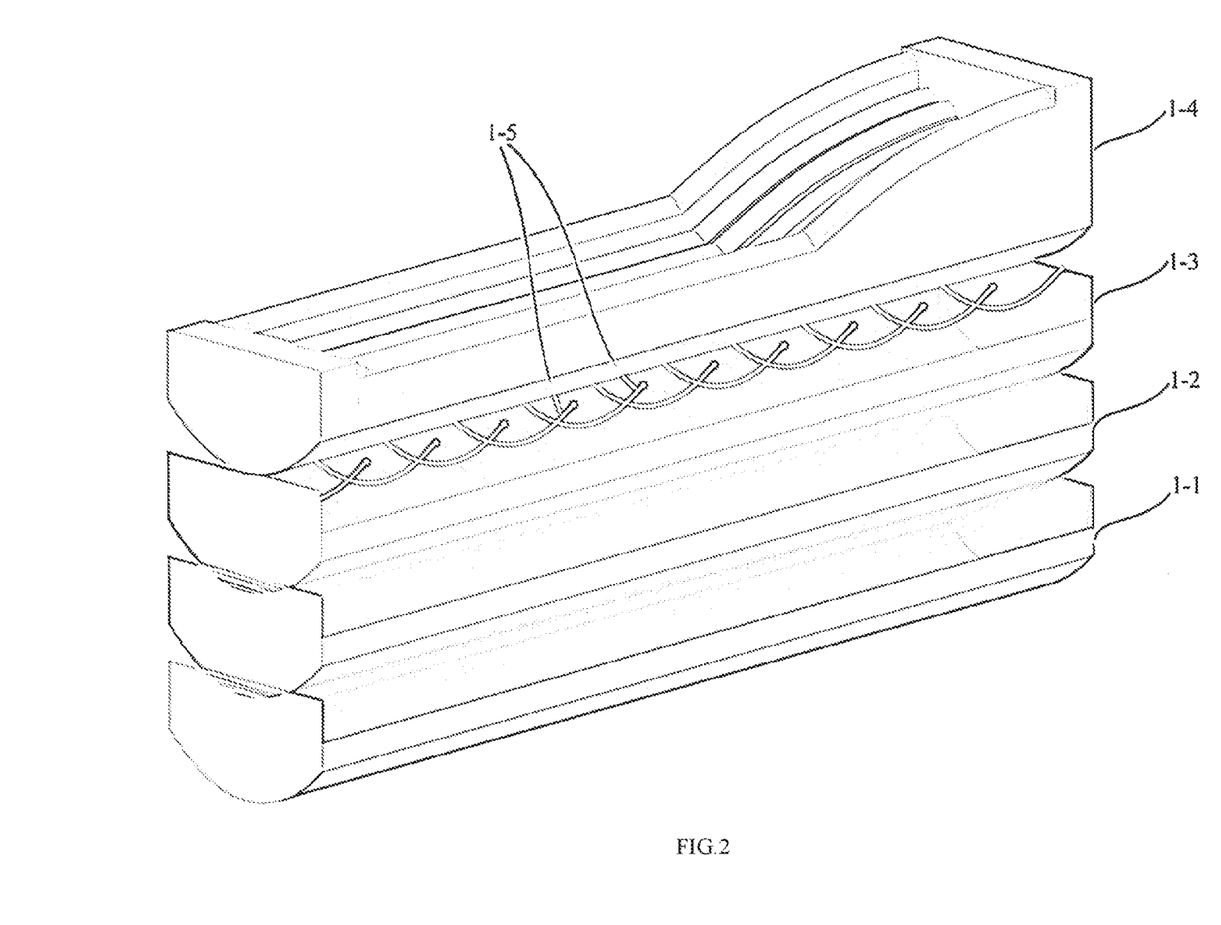
FIG. 2: Layers of the life shield.
Figure 3:
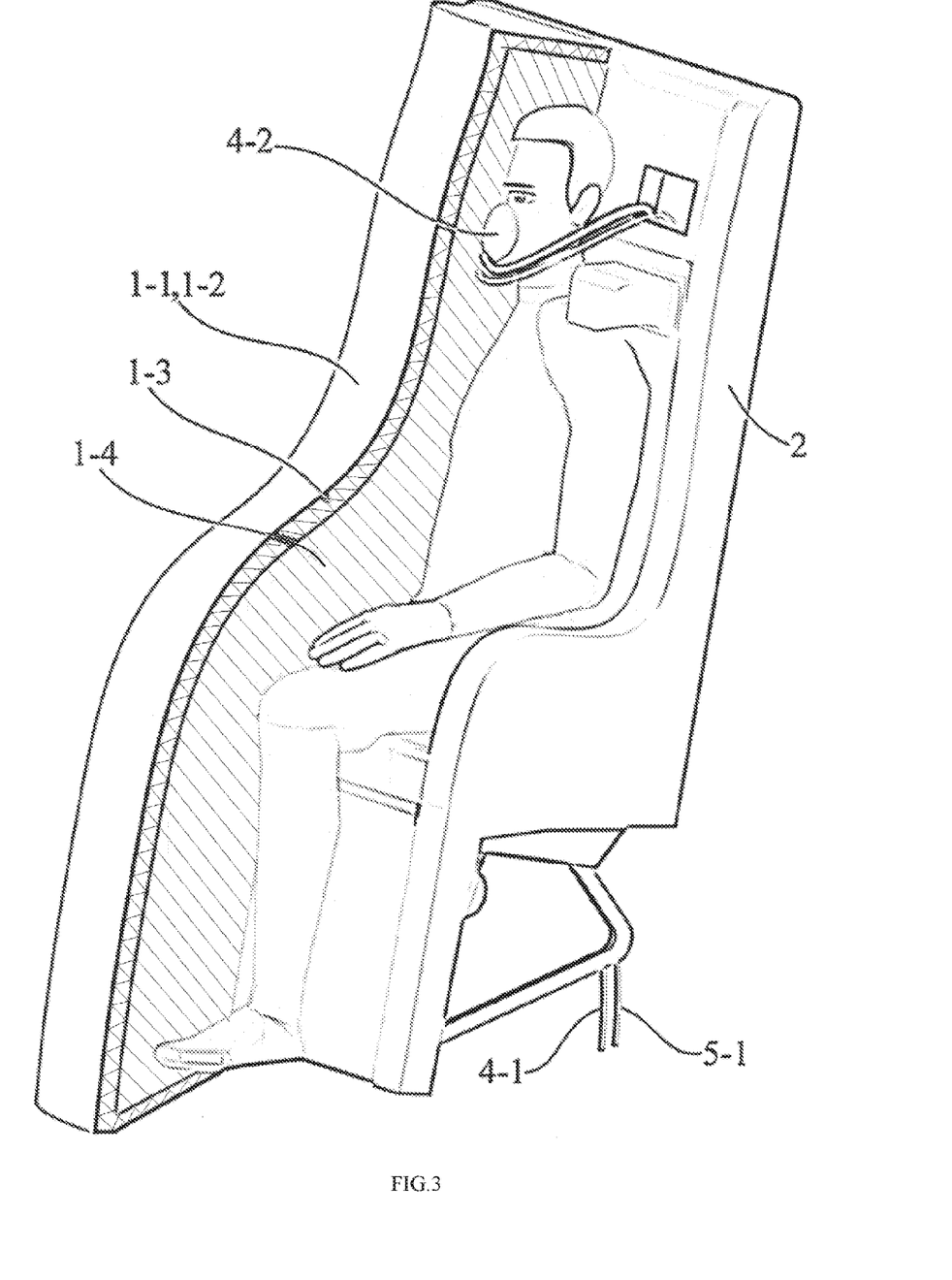
FIG. 3: Section view of life seat in active status.

FIG. 2: Layers of the life shield. This figure is composed of:
  1-1) Flexible Intumescent Fire layer covered with aluminum foil
  1-2) Kevlar or Vectran layer
  1-3) Ceramic fiber layer
  1-4) Airbags
  1-5) Reinforcing bars FIG. 3: Section view of life seat in active status. This figure is composed of:
  1-1) Flexible Intumescent Fire layer covered with aluminum foil
  1-2) Kevlar or Vectran layer
  1-3) Ceramic fiber layer
  1-4) Airbags
  2) Seat
  4-2) Air mask
  4-1) Breathing air hose (air is supplied by airplane engine)
  5-1) Air hose to inflate the airbags (air is supplied by airplane engine)

Figure 4:
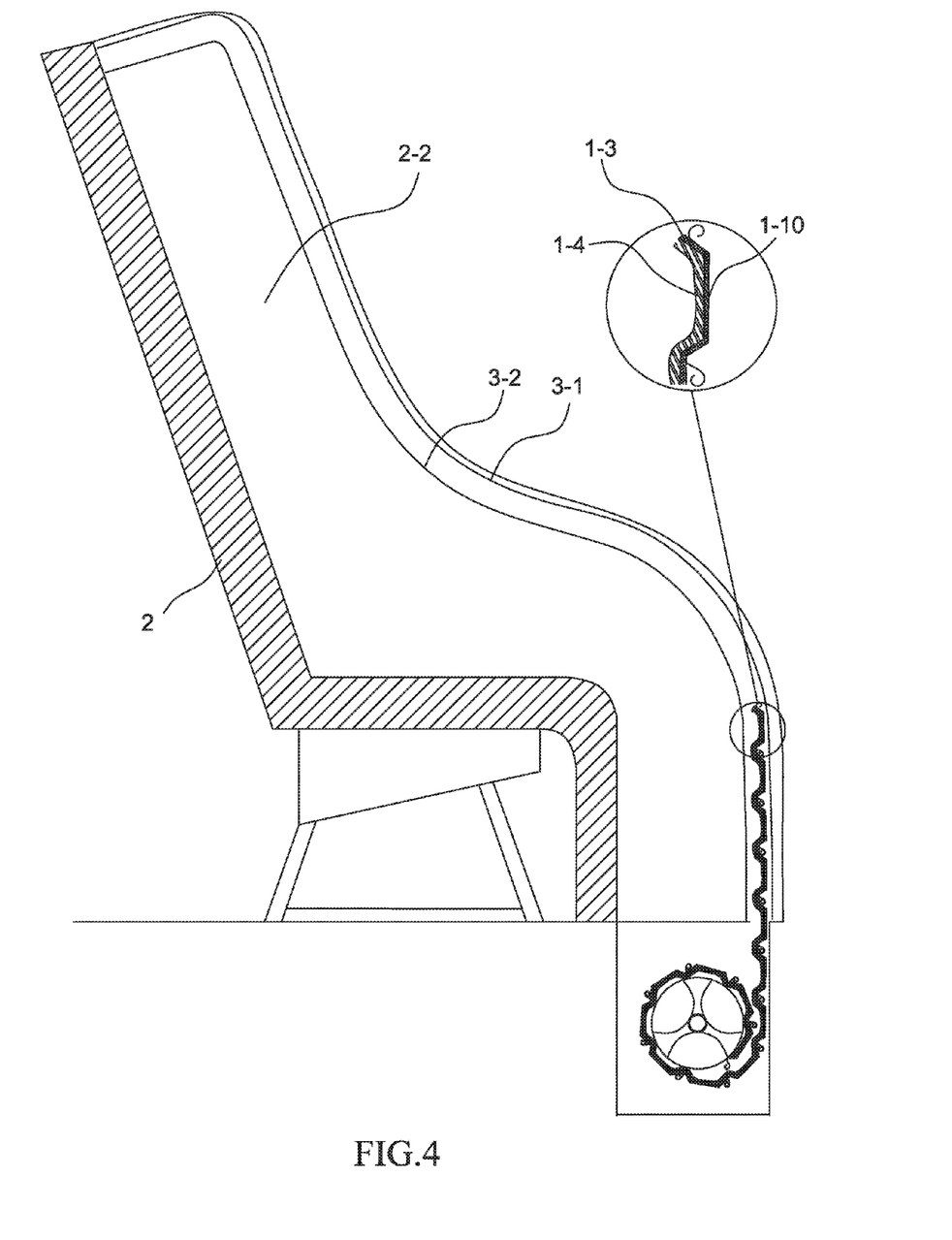
FIG. 4: Section view of life seat with metal Sheet protector (Roller shutter).

FIG. 4: Section view of life seat with metal sheet protector (Roller shutter). This figure is composed of:
  1-3) Ceramic fiber layer
  1-4) Airbags (Retracted)
  1-10) Metal sheets that intumescent fire resistive coatings are applied to it
  2) Seat
  2-1) Seat sides that intumescent fire resistive coatings are applied to external surface
  3-1) Detachable part of guide rail s
  3-2) Fixed part of guide rails (fixed to seat sides)

Figure 5:
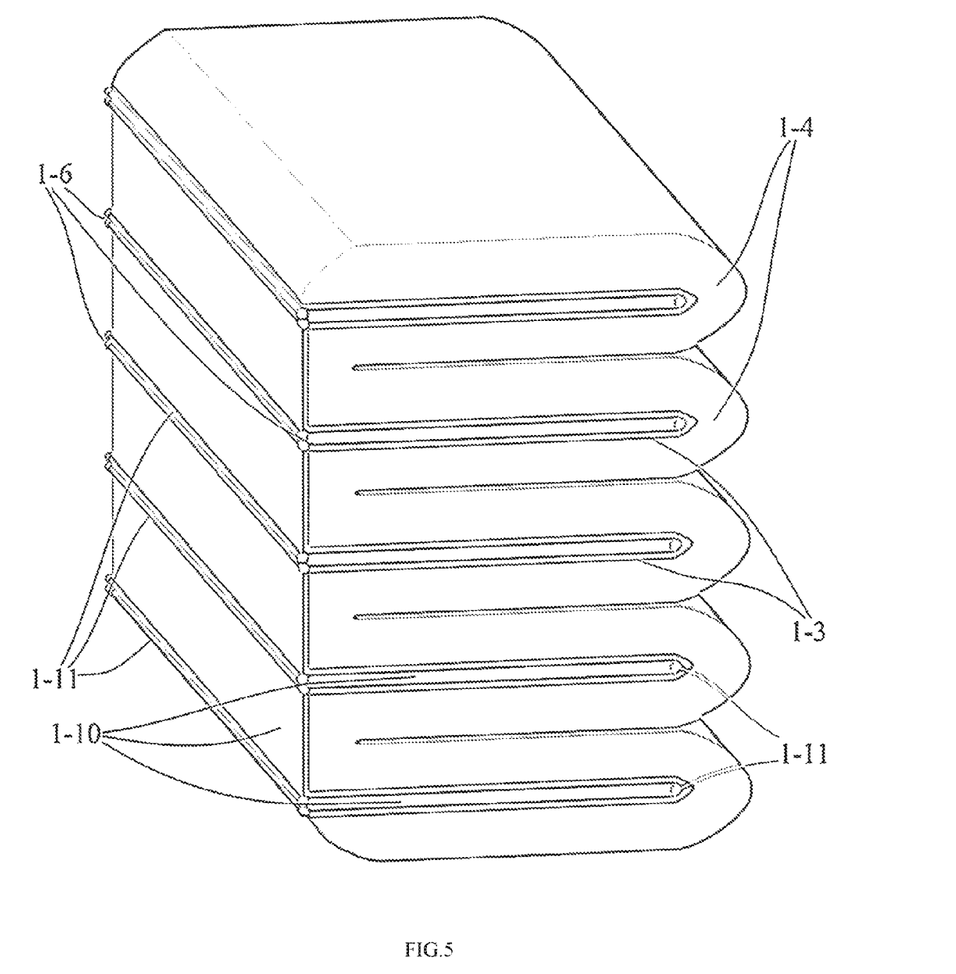
FIG. 5: Life shield with metal sheet protector (Retracted).
Figure 6:
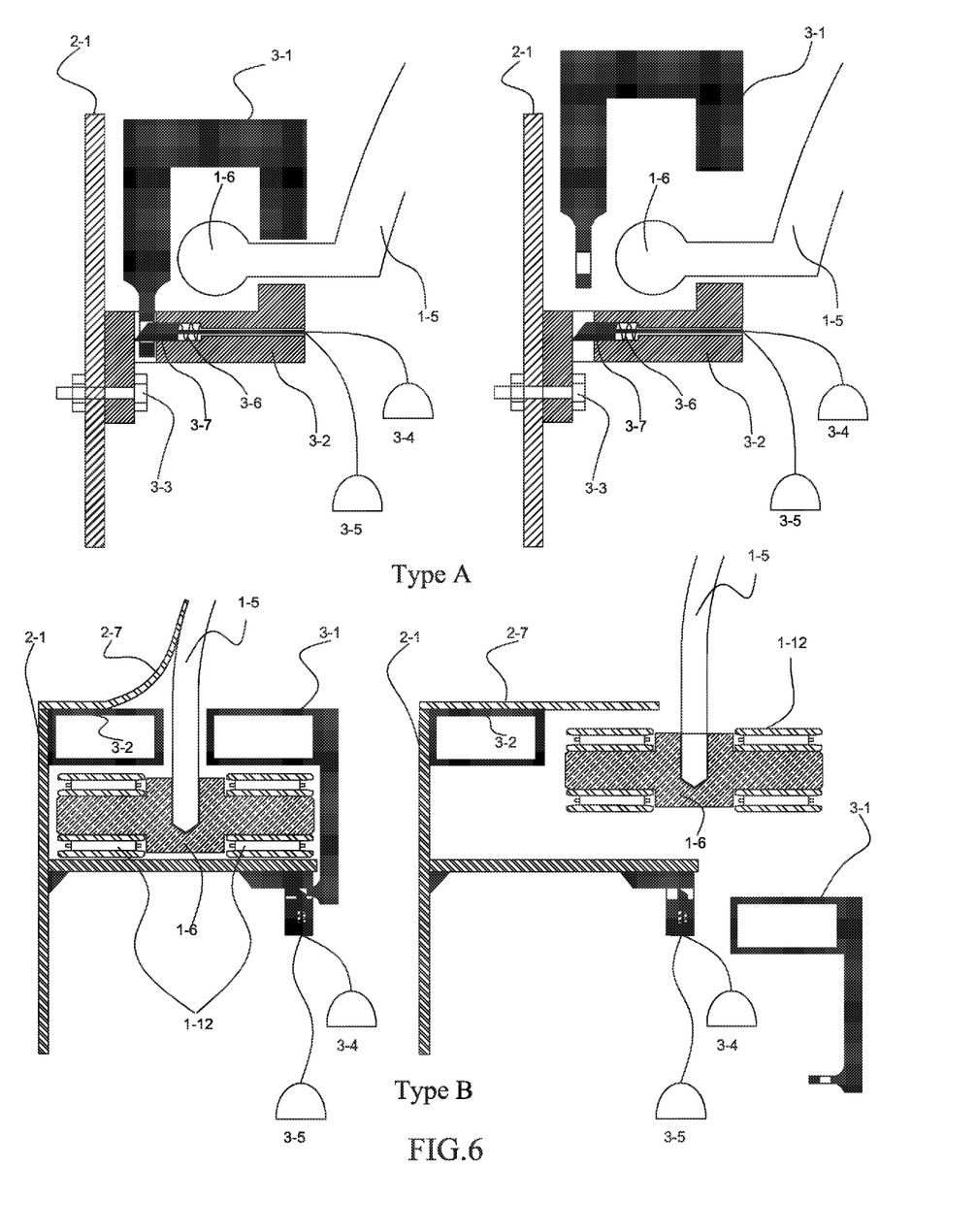
FIG. 6: Section view of two type of guide rails.

FIG. 5: Life shield with metal sheet protector (Retracted). This figure is composed of:
  1-3) Ceramic fiber layer
  1-4) Airbags
  1-6) Sliders 1-10) Metal sheets
1-11) Hinge joint FIG. 6: Section view of two type of guide rails. This figure is composed of:
1-5) Reinforcing bars
1-6) Sliders
1-12) Bearing
2-1) Seat sides
2-7) Flexible intumescent fire seal
3-1) Detachable part of the guide rail
3-2) Fixed part of guide rail (fixed to seat sides)
3-3) Connecting bolt
3-4) Eject handle to disengage detachable part of the guide rail, for the passenger
3-5) Eject handle to disengage detachable part of the guide rail, for first responders
3-6) Spring of trigger
3-7) Pin of trigger FIG. 7: Air ducts for cooling life shield. This figure is composed of:
1-1) Flexible Intumescent Fire layer covered with aluminum foil
1-2) Kevlar or Vectran layer
1-3) Ceramic fiber layer
1-4) Airbags
1-6) Sliders
1-7) Ceramic fiber tape
1-8) Cooling air ducts
6-4) Cooling air distributor FIG. 8: Flow diagram for breathing air system. This figure is composed of:
4-1) Breathing air hose (air is supplied by airplane engine)
4-2) Air mask
4-4) Inlet breathing air valve
4-5) Check valve FIG. 9: Flow Diagram for airbags inflation system. This figure is composed of:
1) Life shield
1-4) Airbags
5-1) Air hose to inflate the bags (air is supplied by airplane engine)
5-2) Inlet air valve
5-3) Check valve
5-4) Hose coupling
5-5) Inlet air hoses
5-6) Outlet air hoses
5-7) Outlet air valve FIG. 10: Flow Diagram for Cooling Air System. This figure is composed of:
1) Life shield
6-1) Inlet cooling gas valve
6-2) Check valve
6-3) Hose coupling
6-4) Cooling air distributor
1-7) Ceramic fiber tapes
1-8) Cooling air ducts FIG. 11: Section view of life shield for economical seat. This figure is composed of:
1-1) Flexible Intumescent Fire layer covered with aluminum foil
1-2) Kevlar or Vectran layer
1-3) Ceramic fiber layer
1-4) Airbags
1-9) Belts to connect Life shield to Seat (stainless steel reinforced ceramic fiber tapes)
2) Economical seat
2-6) Buckle Receptacles
4-1) Breathing air hose (air is supplied by airplane engine)
5-1) Air hose to inflate the airbags (air is supplied by airplane engine)

Figure 12:
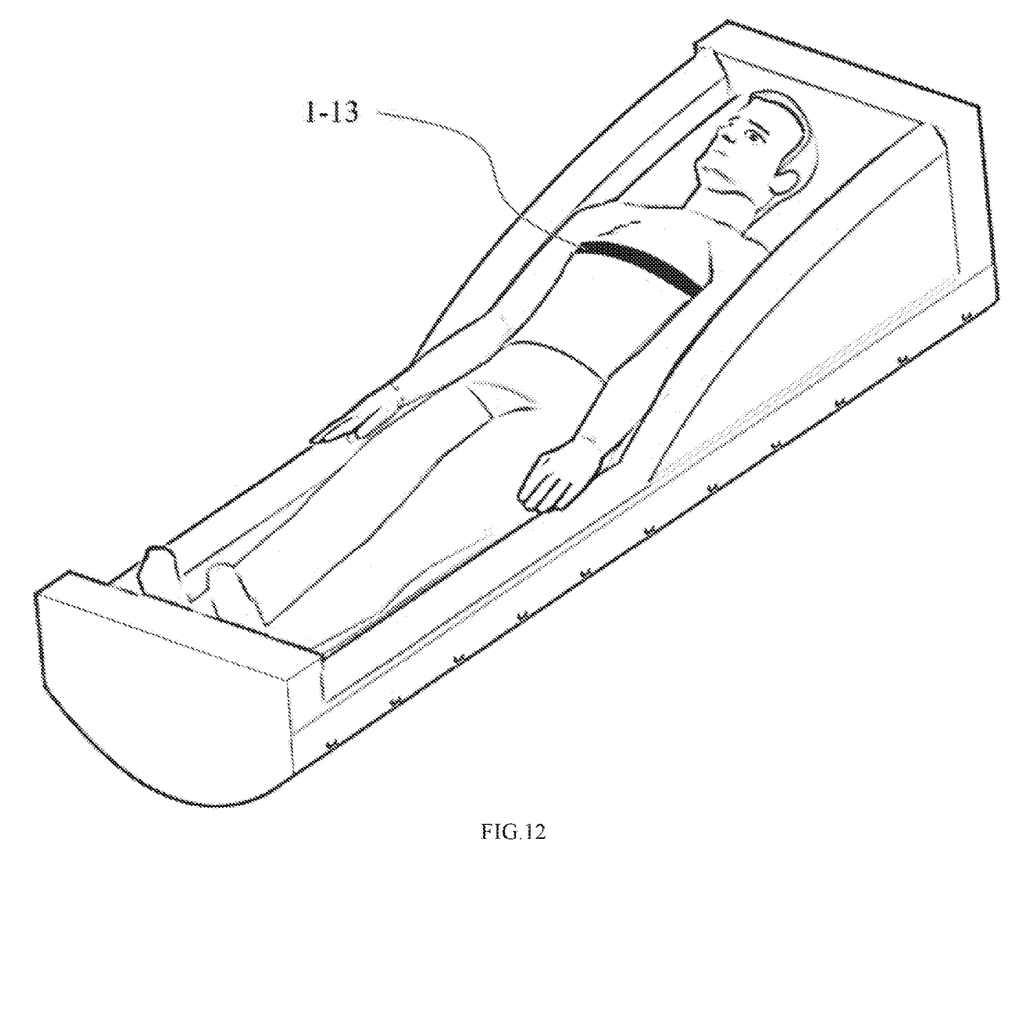
FIG. 12: Passenger floating on water in a lie-down position.

FIG. 12: Passenger floating on water in a lie-down position.
1-13) Belt

III. Description of the Invention:

This invention is composed of several major parts that each part is explained on the following:
1) Life Shield
2) Seat
3) Guide rails
4) Breathing air system
5) Airbags inflation system
6) Cooling air system
7) Triggers and valves
8) Tracking system 1) Life Shield According to the FIG. 2, each life shield is composed of four main layers and reinforcing bars. Life shield in active status along with the seat, isolates passenger from the surrounding environment. This isolated ambient called "passenger's compartment". Layers of life shield are explained in the following:

1-1) First Layer:

This layer consists of Flexible Intumescent Fire covered with aluminum foil (melting point 660° C.) to reflect the maximum heat flux and absorb the least heat flux. The specifications of this layer are:

| Reflection of thermal energy | High |
| Absorption of thermal energy | Very low |
| Resistance to high temperature | High |
| Weight | Low |
| Retractable | Yes |
| Resistance to water penetration | High |

1-2) Second Layer:

This layer is composed of Kevlar, Vectran or flexible stab resistance material that is resistant to the penetration of foreign objects into the passenger's body and also spreads the spot shocks. Spot shock is defined as a high force or shock applied over a small area in a short period of time such as knife impact. Vast impact is defined as a high force or shock applied over a vast area in a short period of time. The specifications of this layer are:

| Resistant to the penetration of external sharp objects | High |
| Resistance to abrasion | High |
| Heat transfer rate (conduction heat transfer coefficient) | Moderate |
| Weight | Low |
| Retractable | Yes |
| Resistance to water penetration | Low |
| Resistance to high temperatures | High |

Given the fact that the second layer is composed of high price materials, it can be neglected, so the life shield only will be able to protect passenger against heat and incoming widely impacts. In this case, the life shield does not protect passengers against sharp objects and the performance will be decreased. For the crew seats of fighter aircrafts, the height of the sides seat (Part 2-1 in FIG. 1) can be increased and use metal sheet and hinge joints to have the retractable capability (FIG. 5) or "Roller shutter" as a layer resistant to sharp objects (FIG. 4). A layer of fire intumescent paint can be done on the metal sheet.

1-3) Third Layer:

This layer is composed of ceramic fiber cloth or flexible heat resistant cloth (rock wool, glass wool) which resists to high temperature as well as has ultra-low thermal conductivity. The specifications of this layer are:

| | |
|---|---|
| Heat transfer rate (conduction heat transfer coefficient) | Low |
| Resistance to high temperature | High |
| Weight | Low |
| Retractable | Yes |
| Resistance to water penetration | Low |

Figure 7:
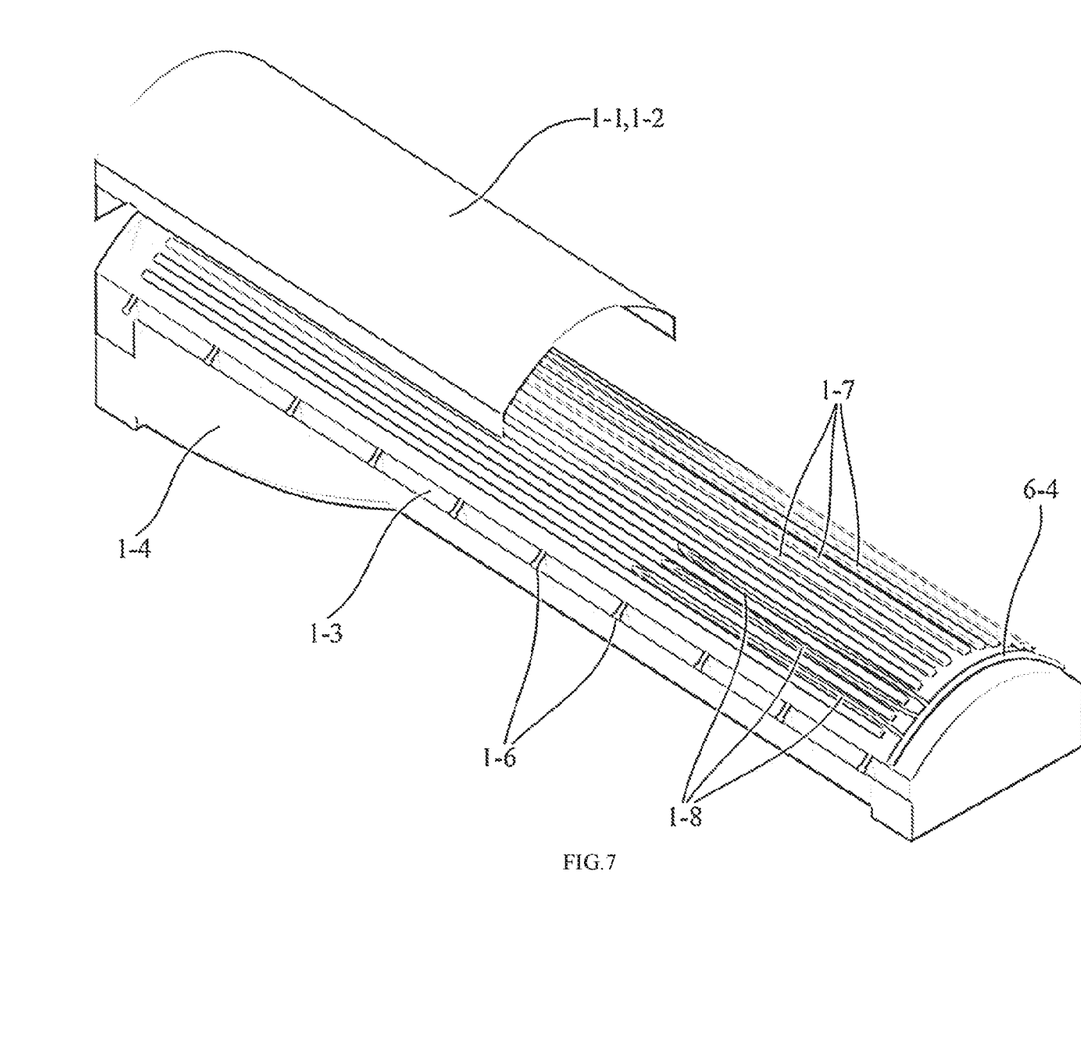
FIG. 7: Air ducts for cooling the life shield.
Figure 10:
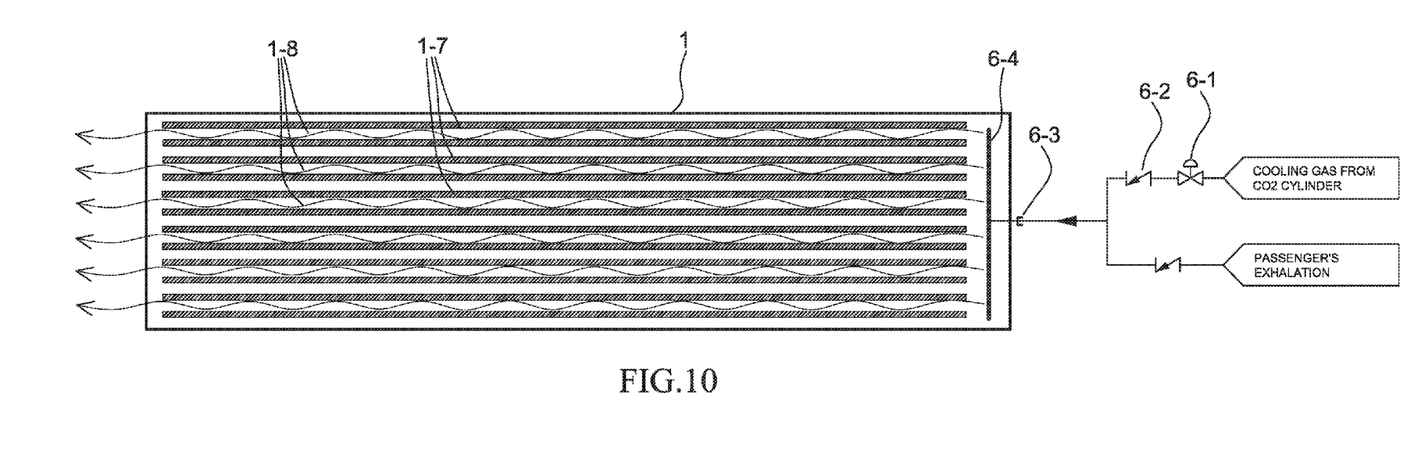
FIG. 10: Flow diagram for cooling air system.

In this layer, air ducts can be included in the ceramic fiber layer to pass cooling air or exhaled air of the passengers to reduce heat transfer of this layer to the next layers (FIG. 7, 10).

1-4) Fourth Layer:

This layer is composed of airbags that holds the passenger in place and damps of the shocks. This layer is composed of several separated airbags that are designed longitudinally from beginning to end of life shield in a parallel layout (according to FIG. 2), consequently this design decreased the fault of airbags which are not deployed during in an incident for any reason, such as puncture one of the airbags. The specifications of this layer are:

| | |
|---|---|
| Damping of impacts | High |
| Rate of heat transfer (conduction heat transfer coefficient) | Low |
| Resistance to high temperature | Moderate |
| Weight | Light |
| Retractable | Yes |
| Resistance to water penetration | High |
| Resistant to the penetration of external sharp objects | Low |

Tasks of this Layer Are:
  Holding the Passenger in Place
    During the airplane crash, because of reduction high speed in a short interval of time, passenger's body throws forward (because of the inertia force). Airbags hold passenger between shell of life shield and the seat. The forces are caused by the inertia, are applied to the entire body of the passenger and soft surface of airbags and do not focus on specific areas such as aircraft seat belts.
  Heat Insulation Around the Passenger
    Conduction heat transfer coefficient of air is low, so airbags not only hold the passenger in place but also is used as heat insulation around the passenger.
  Damping of the Shocks
    The duty of the second layer is to prevent the penetration of the sharp objects into the passenger's body then shocks are damped by the airbags and do not apply to the body of the passenger.

The air which is needed to fill the Fourth layer (Airbags) can be supplied through aircraft engine or small CO2 cylinders (such as modern life vests) or chemical reactions (such as car airbag). The air pressure inside airbags is enough to hold passengers in their places, as well as has no effect on breathing and similar problems for passengers. In addition, the life shield is designed that there is no space between the life shield in active status and seat to prevent entering heat, fuel and sharp objects to the passenger compartment.

1-5) Reinforcing Bars and sliders

Reinforcing bars made of spring steel wire and the duties are:
  Reinforcement of the life shield against vast impacts.
  Connect life shield to seat.
  Help to rigid of life shield at opening time.
  Sliders move in guide rails and help to open the life shield faster.

Reinforcing bars can be eliminated and use stainless steel reinforced ceramic fiber tape and connects sliders (1-6) to the tapes.

2) Seat Specifications:

beside the seat standards, it contains the following specifications:
  The seat back height is tall enough or is adjustable to protects the passenger's head.
  It has the foot back and shoulder restraint.
  Materials and fibers which are used in the manufacturing of the seat are resistant to high temperatures and it also has low thermal conductivity (ceramic fiber, Aerogel or rock wool).
  Body and structure of seat is composed of material resistant to shock and penetration of sharp objects (spring iron sheet, carbon fiber reinforced, . . . ) and intumescent fire resistive coatings are applied to external surface of body
  It has air ducts for passing the cooling air to cool the seat during fire.

3) Guide Rails:

Guide rails are installed on both seat sides and its task is to attach life shield to seat and sliders move in guide rails and help to open the life shield faster. According to FIG. 6, each guide rails have fixed and detachable part. Detachable part is locked on fixed parts. When the eject handle is pulled, detachable part will be disengaged from fixed part and also the life shield detaches from the seat and the passenger is being able to exit from life seat. To get out the passenger from life seat by the first responder, an eject handle is embedded under the seat.

Figure 8:
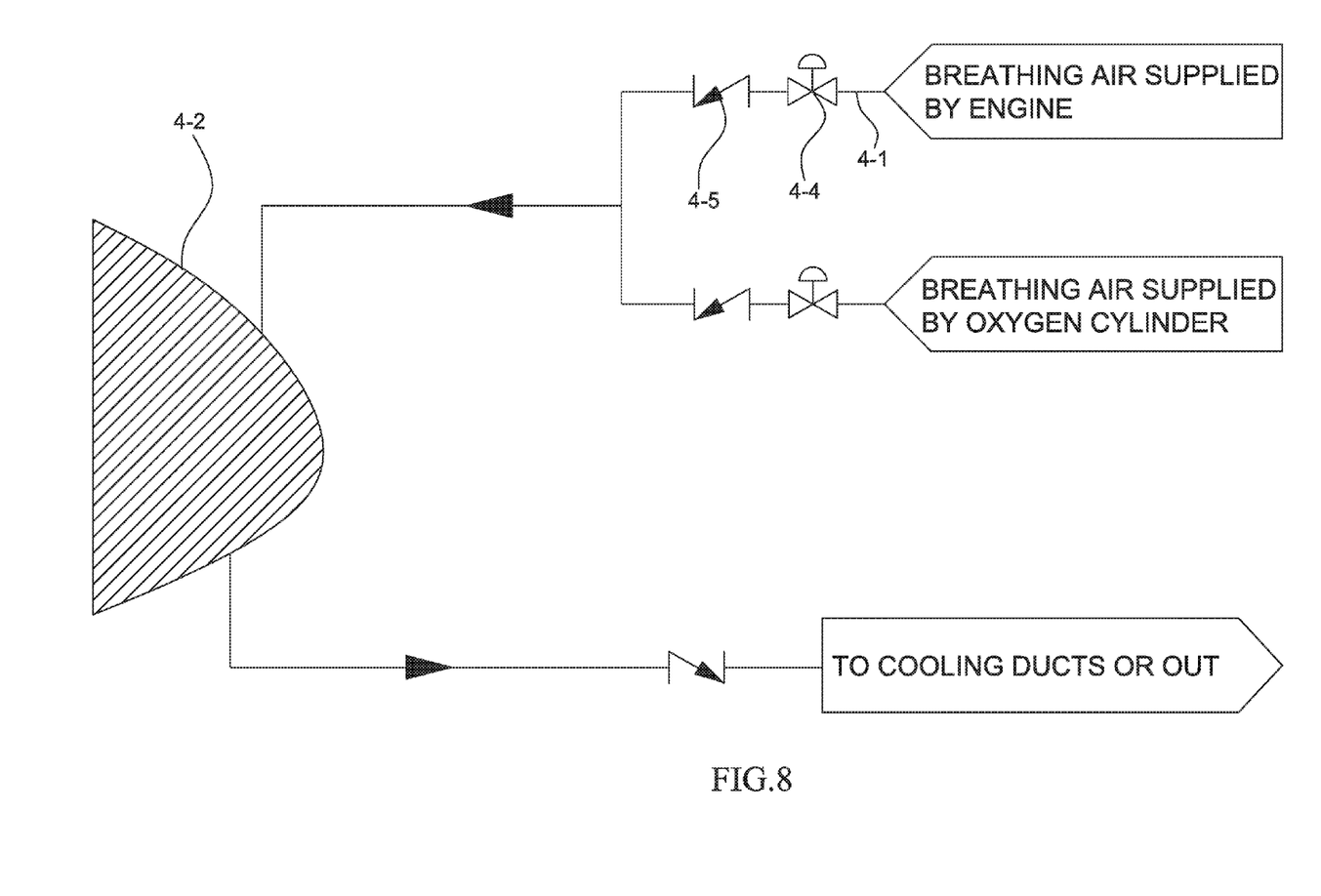
FIG. 8: Flow diagram for breathing air system.

4) Breathing Air System:

Breathing air for passengers is supplied in two ways:
  Aircraft air supply system
  Oxygen cylinder According to FIG. 1, air mask is embedded in the seat back and will be accessible at necessary time. A high temperature hose, connect the mask to the breathing air source (supplied by engines) through the seat leg. Flow Diagram of the breathing air system is shown in FIG. 8. In the incidents that engine air supply is lost; oxygen gas in cylinder will be used to supply passenger breathing air. It is worth mentioning that breathing pure oxygen for a short period of time (about 15 minutes) does not cause breathing problem. Oxygen and CO2 cylinders are preserved in a box that is embedded under the seat (2-5 in FIG. 1) to protect cylinders from shocks, heat and also flight security issues. Exhaled air of passenger can be transferred to cooling ducts for cool the life seat.

5) Airbags Inflation System:

Air to inflate the bags is supplied in two ways:
  Aircraft air supply system
  Chemical reaction (similar to cars airbags) or CO2 cylinder (similar to modern life vests)

Figure 9:
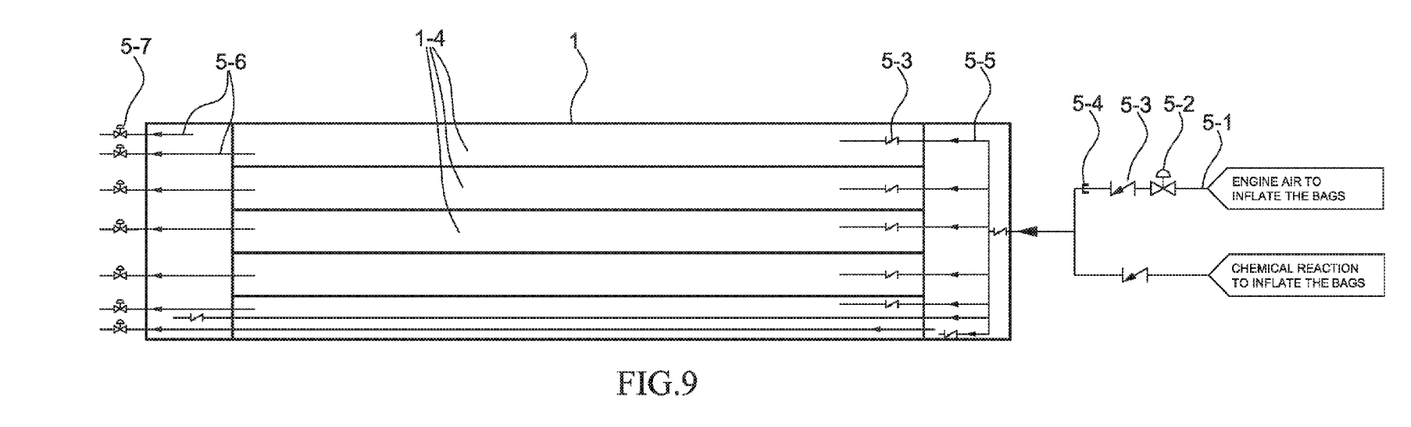
FIG. 9: Flow diagram for airbags inflation system.

Injection of air into the airbags is done by passenger or central system by opening the inlet valve. Chemical reaction system or CO2 cylinder is attached to the life shield and inflates the life shield while it is engaged from the seat. Flow Diagram for Airbags Inflation System is shown in FIG. 9.

6) Cooling air System for Life Shield and Seat:

Dry ice and exhaled air of passengers are used as coolant in incidents with fire. Flow Diagram of the cooling air system is shown in FIG. 10 for life shield. The cooling gas passes through the ducts that are designed in the life shield and the seat and also passes inside the passenger compartment (around the passenger) and causes to cool down the passenger.

7) Triggers and Valves

Triggers:
- Trigger to disengage life shield from the seat (FIG. 6)
- Trigger for active chemical reaction and inflate the airbags (FIG. 9)

Valves
- Valve to inject engine air to airbags (FIG. 9).
- Valve to vent air for from airbags (FIG. 9)
- Valve to inject dry ice into the cooling ducts (FIG. 10)
- Valve to open breathing air that is supplied by airplane engine (FIG. 8)

Instruction for using of triggers and valves must be taught to passengers.

8) Tracking System:

The tracker is attached to the life shield and will be activated after that the life shield is activated or disengaged from the seat and it shows the location of the life shield for a few hours.

IV. Activating Instruction

The passenger is being able to active the life shield by oneself. The passenger sits on the seat (FIG. 3) and fastens the seat belt, then opens the life shield along the guide rails and after wearing the air mask on his/her face and finally opens the valve to Compressed Air fills the airbags.

Get out of the life seat:
- By passenger
  - The upper part of the guide rails (3-1 in FIG. 6 Type A) is detachable from the seat. Passenger pulls the eject handle to disengage the life shield from the seat then is able to get out of the activated life seat.
- By first responder
  - First responder pulls the eject handle (embed under the seat) to disengage life shield from the seat and first responder is able to get out the passenger from life seat or after remove a part of second layer, puncher airbags and then get out the passenger.

V. Economy Class Seats

Figure 11:
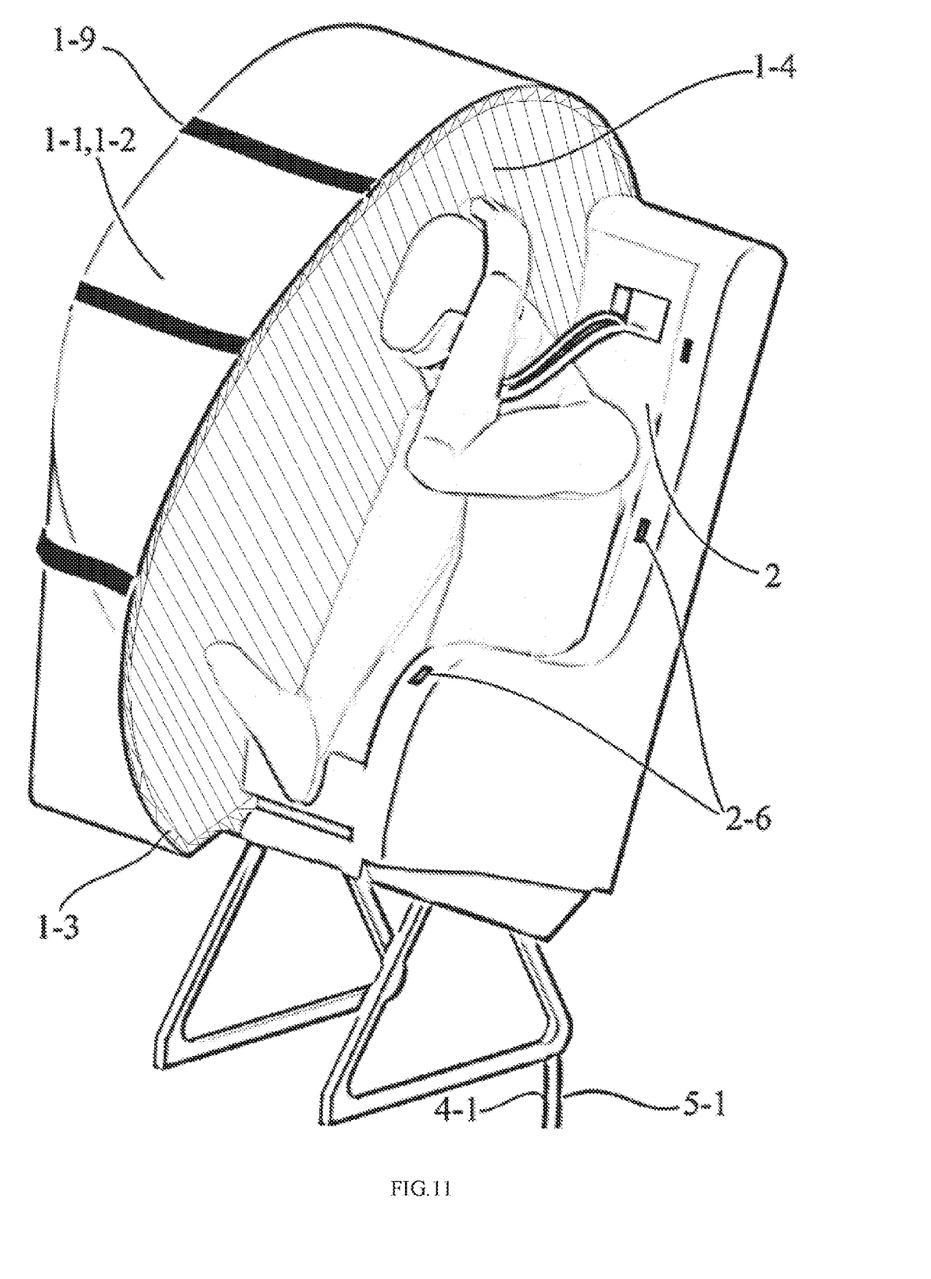
FIG. 11: Life shield for economical seat.

Life shield for economical seats has all characteristics that are mentioned in above. In this type of life shield, "stainless steel reinforced ceramic fiber" belts are used to attach life shield to the seat (FIG. 11). To attach the life shield to the seat, receptacle buckles are used. Receptacle buckles are embedded on seat sides. To disengage life shield from the seat, eject handles are accessible for passenger and first responder. Retracted life shield is placed under the seat and it has the ability to detach from the seat. Hoses for the cooling air system and Airbags Inflation System are connected to hoses of the life shield by coupling (FIG. 9 and FIG. 10). Oxygen and CO2 cylinders are placed under the seat in the cylinder's box.

At the incident time, passenger opens the life shield and after connecting one side of the life shield to seat side, hug knee into chest (FIG. 11) then wears the air mask and connects the other side of the life shield to the seat then opens the valve to fill the airbags with compressed air.

VI. Case Study

Aviation incidents occur on land or in water. The following will be discussed about the details of using the life seat in various incidents:

Incidents on Land

In aviation incidents that happen on land, most of the passenger injuries are caused by impact, burn and penetration of sharp objects into the passenger's body. In this case, life seat remarkably reduces the severity of impact. Incidents on land are divided into two general categories, Incidents with fire and without fire. Each case is explained in detail in the following:

Land Incidents Without Fire (Iran Air Flight 277)

In land incidents without fire, most of passenger injuries are caused by impact or penetration of sharp objects into the passenger's body. The second layer spread spot impacts and the fourth layer keeps passenger in place as well as damping off impacts.

Land Incidents With Fire (Sepahan Airlines Flight 5915)

In land incidents with fire, life seat not only protects passenger from impact and penetration of sharp objects into the passenger's body, but also builds a thermal insulation around the passenger and provides necessary conditions for passenger survival for a short period of time (about 15 min). Dry ice passes inside the passenger compartment (around the passenger) to cool the passenger compartment during of fire. The cooling gas passes through the ducts which are designed in the life shield and the seat to cool down the passenger compartment too.

Incidents in water

In the accidents that happened in water, most injuries of passengers are caused by impact and suffocation. The major causes of suffocation are impacts and high acceleration that result injury or unconscious that make passenger unable to act appropriately in this situation. Events in water are divided in two general categories that each case is explained in the following:

Landing on Water (US Airways Flight 1549)
  If landing on water is possible, the passenger is able to disengage the life shield from the seat (which is not activated) and after leaving the plane, inflates the life shield and the passenger uses it as a boat to be floated on the water in lie-down position (FIG. 12).

Crash in Water (IR-CAO Falcon in Kish)
  In the cases that airplane crashes in water, passenger is able to active life shield while seated on the seat to protect passenger from shocks. After the airplane crash into water, passenger disengages the life shield from the seat and uses it as a boat. Usually after crash airplane in water, the fuselage is torn apart.

What is claimed is:

1. A device defining a life seat comprising:
    a seat;
    first and second guide rails, wherein the first and second guide rails are attached to respective seat sides;
    a protective cover defining a life shield, wherein the protective cover is attached to the seat by the first and second guide rails and moves along the guide rails, the seat along with the life shield configure a compartment defining a passenger compartment that fully covers a body of passenger and is capable of protecting the passenger from shocks, burns, and sharp objects during an incident;
    a breathing air system configured to supply breathing air for the passenger during the incident;
    a cooling system configured to supply cooling gas to cool the passenger compartment during the incident; and
    a tracking system attached to the life shield that is capable of displaying location of the life shield during and after the incident.

2. The device according to claim 1, the life shield has layers further comprising:
    a layer capable of resisting heat absorption;
    a layer capable of resisting heat transfer;
    a layer capable of resisting penetration of sharp objects;
    an airbag layer;

an airbag inflation system configured to supply gas to inflate a plurality of airbags in the airbag layer;

reinforcing bars, wherein the layers are attached to the reinforcing bars, and the reinforcing bars are configured to attach the life shield to the guide rails.

3. The device according to claim 1, the life shield being retractable and further comprising:
- a flexible intumescent fire layer that is covered with aluminum foil;
- a flexible stab resistant layer capable of resisting penetration of sharp objects;
- a layer of ceramic, stone fiber or other material resistant to high temperatures and having low thermal conductivity, the layer of ceramic, stone fiber or other material resistant to high temperatures and having low thermal conductivity also including cooling air ducts;
- separate airbags configured longitudinally from a beginning to an end of the life shield;
- an airbag inflation system capable of supplying gas to inflate the separate airbags comprising:
  - an air supply system;
  - a chemical reaction system that releases gas; and
  - a CO2 cylinder;
- reinforcing bars with sliders configured to attach the life shield to the guide rails, wherein the sliders enable the life shield to open along the guide rails.

4. The device according to claim 1, the life shield in the form of roller shutter, further comprising:
- a flexible intumescent fire coating;
- a plurality of metal sheets;
- a layer of ceramic, stone fiber or other material resistant to high temperatures and having low thermal conductivity, the layer of ceramic, stone fiber or other material resistant to high temperatures and having low thermal conductivity also including cooling air ducts;
- separate airbags configured longitudinally from a beginning to an end of the life shield;
- an airbag inflation system capable of supplying gas to inflate the separate airbags comprising:
  - an air supply system;
  - a chemical reaction system that releases gas; and
  - a CO2 cylinder.

5. The device according to claim 1, the seat further comprising:
- a body that is capable of protecting the passenger from sharp objects;
- a box fixed to under the body for housing a cylinder;
- a layer of intumescent fire resistive coating applied to the external surface of the body;
- a foot back;
- left and right adjustable shoulder restraints attached to the body;
- cooling ducts configured to pass cooling gas to cool the passenger compartment;
- soft materials and fibers between the passenger and the seat body, the soft materials and fibers capable of resisting high temperatures and having low thermal conductivity.

6. The device according to claim 1, further comprising:
each of the guide rails comprising:
- a fixed part configured from a bottom to a top of the seat and fixed to a respective seat side;
- a detachable part configured parallel to the fixed part and locked on the fixed part;
- an eject handle for a passenger and another eject handle for a first responder that are capable of disengaging the detachable part from the fixed part and also detach the life shield from the seat.

7. The device according to claim 1, the breathing air system comprising:
- an oxygen cylinder;
- a regulator connected to the oxygen cylinder;
- a high temperature air mask;
- an airplane air supply system;
- high temperature hoses that transfer oxygen from the cylinder or the airplane air supply system to the air mask and are also capable of transferring exhaled air of the passenger to the cooling ducts or out of the passenger compartment.

8. The device according to claim 1, the cooling system comprising:
- a cooling gas cylinder;
- a regulator connected to the cooling gas cylinder;
- an airplane air supply system;
- high temperature hoses that transfer cooling gas from the cylinder or the airplane air supply system to cooling ducts in the seat or in the life shield.

* * * * *